US009560005B2

(12) United States Patent
Bastide et al.

(10) Patent No.: US 9,560,005 B2
(45) Date of Patent: *Jan. 31, 2017

(54) ORGANIZING SOCIAL NETWORK MESSAGES BASED ON TEMPORAL CHARACTERISTICS

(71) Applicant: INTERNATIONAL BUSINESS MACHINES CORPORATION, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,156

(22) Filed: Mar. 18, 2015

(65) Prior Publication Data
US 2015/0312201 A1    Oct. 29, 2015

Related U.S. Application Data

(63) Continuation of application No. 14/262,294, filed on Apr. 25, 2014.

(51) Int. Cl.
  *H04L 12/58* (2006.01)
  *G06F 17/30* (2006.01)
(52) U.S. Cl.
  CPC ......... *H04L 51/32* (2013.01); *G06F 17/30598* (2013.01)

(58) Field of Classification Search
  None
  See application file for complete search history.

(56) References Cited

U.S. PATENT DOCUMENTS

| 2004/0143636 | A1* | 7/2004 | Horvitz | G05B 19/404 709/207 |
| 2009/0094189 | A1 | 4/2009 | Stephens | |
| 2009/0235253 | A1 | 9/2009 | Hope | |
| 2011/0119258 | A1* | 5/2011 | Forutanpour | G06Q 10/107 707/723 |
| 2011/0125793 | A1* | 5/2011 | Erhart | G06Q 30/02 707/776 |
| 2011/0184727 | A1 | 7/2011 | Connor | |

(Continued)

OTHER PUBLICATIONS

International Business Machines Corporation, "List of IBM Patents or Patent Applications Treated as Related," submitted Mar. 25, 2015, 2 pages.

(Continued)

*Primary Examiner* — Maryam Ipakchi
(74) *Attorney, Agent, or Firm* — Charles L. Moore; Moore & Van Allen PLLC

(57) ABSTRACT

A method for organizing messages may include detecting, by a processor, receipt of each new message of an activity stream comprising a group of messages and determining, by the processor, a tense associated with each new message. The method may also include associating, by the processor, the tense with each new message. At least the tense may be used for organizing the group of messages of the activity stream. The method may additionally include adding, by the processor, each new message and the associated tense of the message to the activity stream.

12 Claims, 5 Drawing Sheets

(56) References Cited

U.S. PATENT DOCUMENTS

2013/0031183 A1* 1/2013 Kumar ............... H04L 12/5825
 709/206
2013/0132071 A1 5/2013 Peterson
2013/0297705 A1 11/2013 Arora et al.

OTHER PUBLICATIONS

IBM, "SPSS Text Analytics for Surveys," downloaded from <http://www-03.ibm.com/software/products/en/spss-text-analytics-surveys> on Feb. 5, 2014, pp. 1-3.
IBM, "SPSS Statistics," downloaded from <http://www.-01.ibm.com/software/analytics/spss/products/statistics/> on Feb. 5, 2014, pp. 1-4.
Gong et al., "Classifier-based Tense Model for SMT," Proceedings of Coling 2012. Dec. 2012. pp. 411-420.
Rohall et al., "ReMail: A Reinvented Email Prototype," Computer Science, Oct. 28, 2013. pp. 1-2.
Goncalves et al., "Modeling Users' Activity on a Twitter Networks: Validation on Dunbar's Number," PLoS ONE, vol. 6, Issue 8, Aug. 2011, pp. 1-5.
Wikipedia, "Grammatical tense," downloaded from <http://en.wikipedia.org/wiki/grammatical_tense> on Mar. 28, 2014, pp. 1-6.
Wikipedia, "Natural language processing," downloaded from <http://en.wikipedia.org/wiki/Natural_language_processing> on Feb. 5, 2014, pp. 1-10.
Wikipedia, "N-gram," downloaded from <http://en.wikipedia.org/wiki/N-grams> on Mar. 11, 2014, pp. 1-7.
Wikipedia, "Allen curve," downloaded from <http://en.wikipedia.org/wiki/Allen_curve> on Feb. 5, 2014, pp. 1-3.
Wikipedia, "Dunbar's number," downloaded from <http://en.wikipedia.org/wiki/Dunbar%27s_number> on Feb. 5, 2014, pp. 1-5.

* cited by examiner

ORGANIZING SOCIAL NETWORK MESSAGES BASED ON TEMPORAL CHARACTERISTICS

CROSS-REFERENCE TO RELATED APPLICATIONS

This application is a continuation application of U.S. patent application Ser. No. 14/262,294, filed. Apr. 25, 2014, the contents of which are incorporated herein by reference in its entirety.

BACKGROUND

Aspects of the present invention relate to social networks, and more particularly to a method, system and computer program product for organizing social network messages based on temporal characteristics of the messages.

Online social networks are a universal mechanism to connect people and information in logical and organized ways which enable sharing and processing of information, between the members of the social network. Common mechanisms for sharing and processing information on online social networks may include, but is not necessarily limited to, a wall or virtual wall where users or member of the social network can post messages for other users or members; an activity stream which may be a list, of messages or posts received by a user or member and may also include a list of messages or posts sent by the user or member; a timeline that may chronologically list a series of events, and profiles of users or members that can be accessed for information about a particular user or member. These mechanisms enable users or members to rapidly share information with others and gather information from others in the network.

Studies have shown that an online social network user can maintain stable relations with about 100 to about 200 people. As users develop social networks and normalize around a stable number of relations, each message a network contact or member posts may be carefully evaluated so the most stable social networks may be maintained. The number of messages a user or member may see each day may exceed about one hundred messages a day for a low participation network, and for a high participation network the number of messages viewed, by a user may exceed about a thousand messages. Accordingly, important messages, such as messages that may require action, indicate future work, or other information of significance to the user may be lost or overlooked by the user. Therefore, a need exists for a solution which enhances the ability of the user to see important posts or messages from other users in the network.

BRIEF SUMMARY

According to one aspect of the present invention, a method for organizing messages may include detecting, by a processor, receipt of each new message of an activity stream comprising a group of messages and determining, by the processor, a tense associated with each new message. The method may also include associating, by the processor, the tense with each new message. At least the tense may be used for organizing the group of messages of the activity stream. The method may additionally include adding, by the processor, each new message and the associated tense of the message to the activity stream.

According to another aspect of the present invention, a system for organizing messages may include a processor and a social networking module operating on the processor. The social networking module may include a message organizing module. The message organizing module may be configured, to perform a set of functions that may include detecting receipt of each new message of an activity stream comprising a group of messages and determining a tense associated with each new message. The set of functions may also include associating the tense with each new message. At least the tense may be used for organizing the group of messages of the activity stream. The set of functions may also include adding each new message and the associated tense of the message to the activity stream.

According to another aspect of the present invention, a computer program product for organizing messages may include a computer readable storage medium having program instructions embodied therewith. The program instructions are executable by a device to cause the device to perform a method that may include detecting receipt of each new message of an activity stream including a group of messages. The method may also include determining a tense associated with each new message and associating the tense with each new message. At least the tense may be used for organizing the group of messages of the activity stream. The method may additionally include adding each new message and the associated tense of the message to the activity stream.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
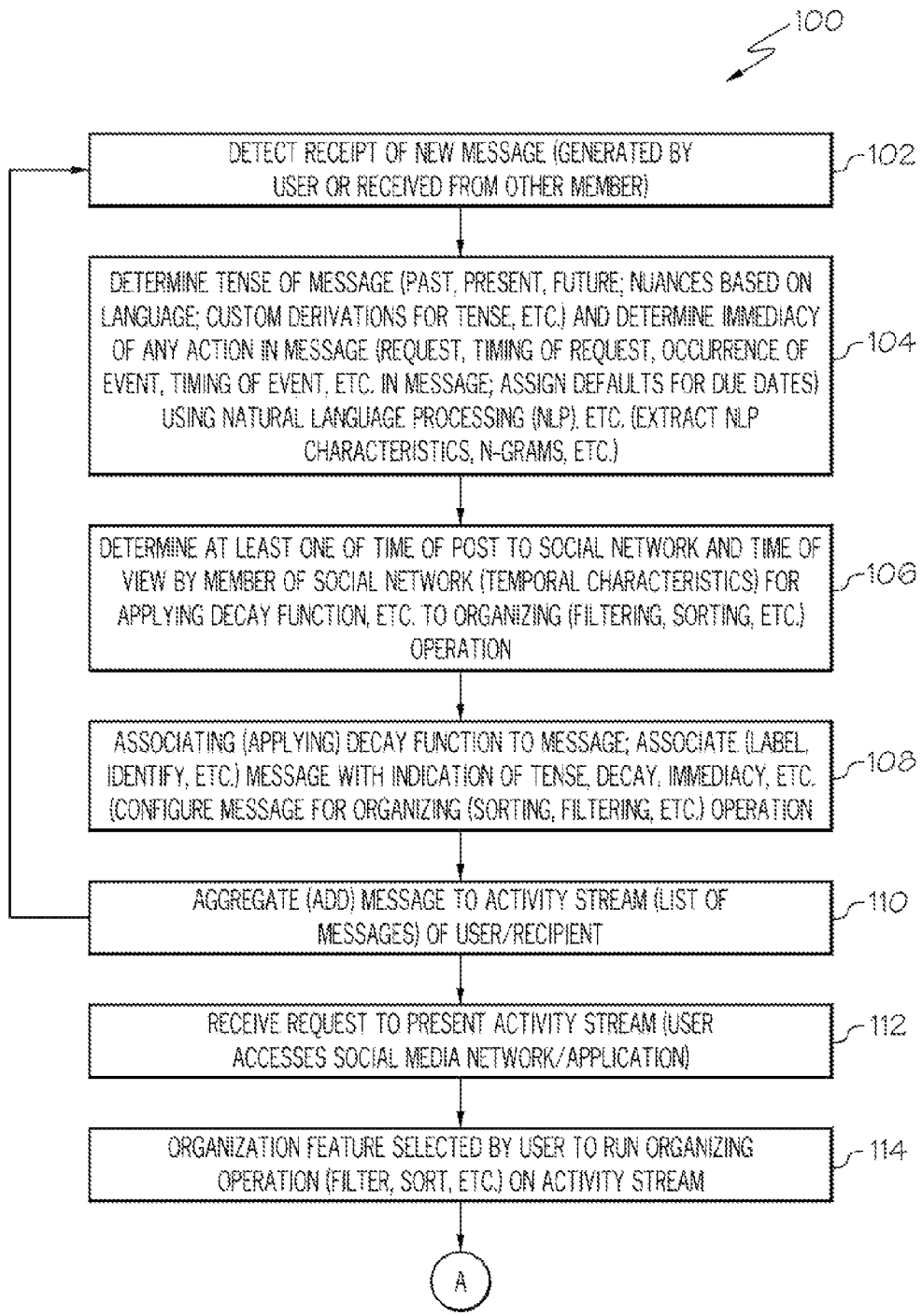
FIGS. 1A-1B (collectively FIG. 1) are a flow chart of an example of a method for organizing social network messages in accordance with an embodiment of the present invention.

The present invention may be a system, as method, and/or as computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating, electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described, herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing, the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions whish implement aspects of the function/act specified in the flowchart and/or block diagram block or blocks.

The computer readable program instructions ma also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified the flowchart and/or block diagram block or blocks.

In accordance with an embodiment of the present in on a system or method performed by the system may optimize a presentation of messages in a social network by aggregating the set of messages posted by a user and the users followers or members of the user's social network; identifying the tenses of the language (past, present, future) used in the messages; and organizing the presentation of the messages based on at least one of the immediacy of the messages and tenses of the messages. As described in more detail herein, the tense of the messages may be determined by natural language processing (NLP) or by other techniques of analyzing text in a message to determine the content of the message. The immediacy of the messages may be determined by detecting any request, occurrence of an event or other item in any of the messages that may call for a response, performance of some action, etc. within some period of time. As used herein, message may refer to a post, update or other item in an activity stream associated with a social network. An activity stream may refer to a group of messages posted on a wall or virtual wall of a social medium, a group of messages received by a user and transmitted by a user, or any other mechanism for sharing information and interaction between members of a social network. Accordingly, an activity stream may be a list of messages, posts, updates or the like received by a member of a social network and may also include any message, posts or updates created by the member or user of the social network.

The system and method of the present invention as described herein may also be used for optimizing the presentation of any set of messages or other communications. For example, a search of an entire social network system may be performed to identify tenses, immediacy and other temporal characteristics. The messages may then be organized (filtered, sorted, etc.) based on these temporal characteristics using the features described herein to facilitate a user identifying those messages that may have a higher priority or importance or may need more immediate attention and not get lost or overlooked in a large volume of messages.

The system and method may also detect future tense usage when a user is creating a message. The system and method may prompt the user to set, a time or time period for the message to expire or for the message to be changed, such as changing the tense of the message or immediacy of the message. Associating the set time period for the message to expire or the message to be changed, allows the system or method to more effectively process messages and optimize the presentation of the messages to the user as described herein.

Figure 1B:
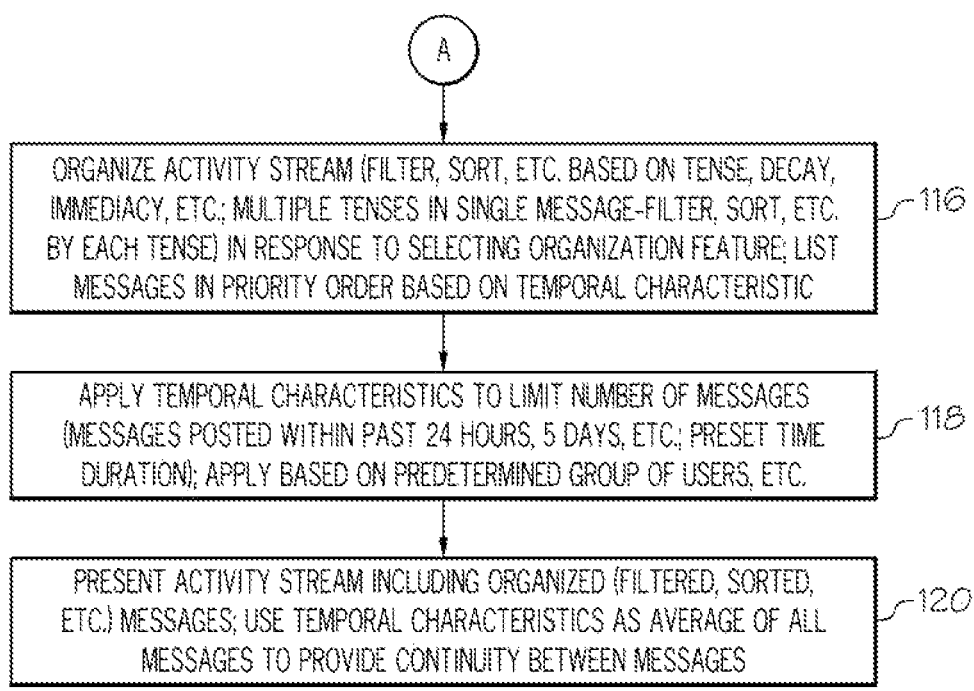

FIGS. 1A-1B (collectively FIG. 1) are a flow chart of an example of a method 100 for organizing (filtering, sorting, etc.) social network messages in accordance with an embodiment of the present invention. In block 102, receipt of a new message or each new message associated with a social network may be detected. The new message or each new message may be detected by a processor of a server hosting a social networking module or system configured to perform the functions and operations described herein, or by a processor of a computer system of a user or member of the social network or both. The new message may be generated by the user or may be received from another member of the social network.

In block 104, a tense associated with the new message or each new message may be determined. The tense associated with each new message may include using natural language processing (NLP) to determine at least one of a past tense, a present tense, and a future tense associated with each new message. NLP characteristics may be extracted from each new message, such as N-grams, parts-of-speech N-gams, nouns, grammars and other characteristics based NLP. The tense may also be determined by any other technique for analyzing the text in a message to automatically determine the content and tense of the message.

Determining the tense associated with each new message may also include determining any nuances based on a language of each new message. Some languages do not have or use tenses and other languages may not be easily characterized as including or expressing past, present and future tenses similar to English. For example, determining any nuances based on the language of each new message may include determining any derivations of the tense associated with each new message based on the language of each new message by translating each new message to English or another predetermined language using a classifier-based tense model for statistical machine translation of each new message. Other machine language translation tools may also be used to determine nuances associated with the tense of the message based on the message being in a different language than that being used to analyze the messages for organizing the messages based on tense.

In block 104, an immediacy of any item or action in each new message or associated with each new message may also be determined. The immediacy of each new message may be determined by analyzing each new message using NLP or another language processing techniques to determine if the message includes a request for performance of a task, an event scheduled to occur at a future time or other time sensitive item or action. A due date for completion of the task, a date for occurrence of the event or other timing of the item or action may also be determined from the message using NLP or other techniques. An indication of the immediacy may be assigned or associated with each new message in response to the message including some time sensitive item or action and the due date or timing for the event from a current time. For example, the indication may include associating the due date for completion of the task or the date for occurrence of the event or other time sensitive item or action as determined from analysis of the message. A default due date or time for occurrence may be assigned to a particular new message for determining the immediacy in response to the particular new message not including a due date for completion of the task or time for occurrence of the event or other time sensitive action.

In block 106, at least one of a time of posting each new message to the social network or a time of viewing or first viewing of each new message by a member of the social network or a particular member of the social network may be determined. The time of posting or time of first viewing of each new message by any member or a particular member of the social network may be referred to as temporal characteristics associated with the message. The temporal characteristics of the message may be used for applying a decay or a decay function to the message. The decay or decay function may be used for organizing the messages in an activity stream of a user as described in more detail herein.

In block 108, the decay or decay function may be associated with the message or applied to the message. The decay or decay function may include one of invalidating the message or changing the tense of the message based on a duration of time from at least one of when the message was posted to the social network or when the message was viewed or first view by any member of the social network or by a particular member of the social network. The particular member may a member of the social network for whom the message may be specifically addressed or intended.

In block 108, an indication of the tense, decay, immediacy and any other characteristic may each be associated with each new message for organizing the messages in the activity stream of the user. A label, identity or other indicator may be assigned or associated with each message for indicating the tense, decay and immediacy. The indicator may also be metadata that indicates tense, decay and immediacy of the message. Accordingly, the messages may be configured for performance of an organizing operation that may include filtering, sorting or other optimizing arrangement of the messages in the user's activity stream to facilitate the user identifying those messages that may have a higher priority or importance or may need more immediate attention and not get lost or overlooked in the volume of messages that may be in the user's activity stream.

In block 110, each new message may be aggregated or added to the activity stream of the user or recipient of the messages along with the indication or indications of the tense, decay and immediacy of each message. As previously discussed, the activity stream may also include messages generated by the user or recipient. The method 100 may then return to block 102 and may proceed as previously described as each new message is received or generated by the user.

Figure 2A:
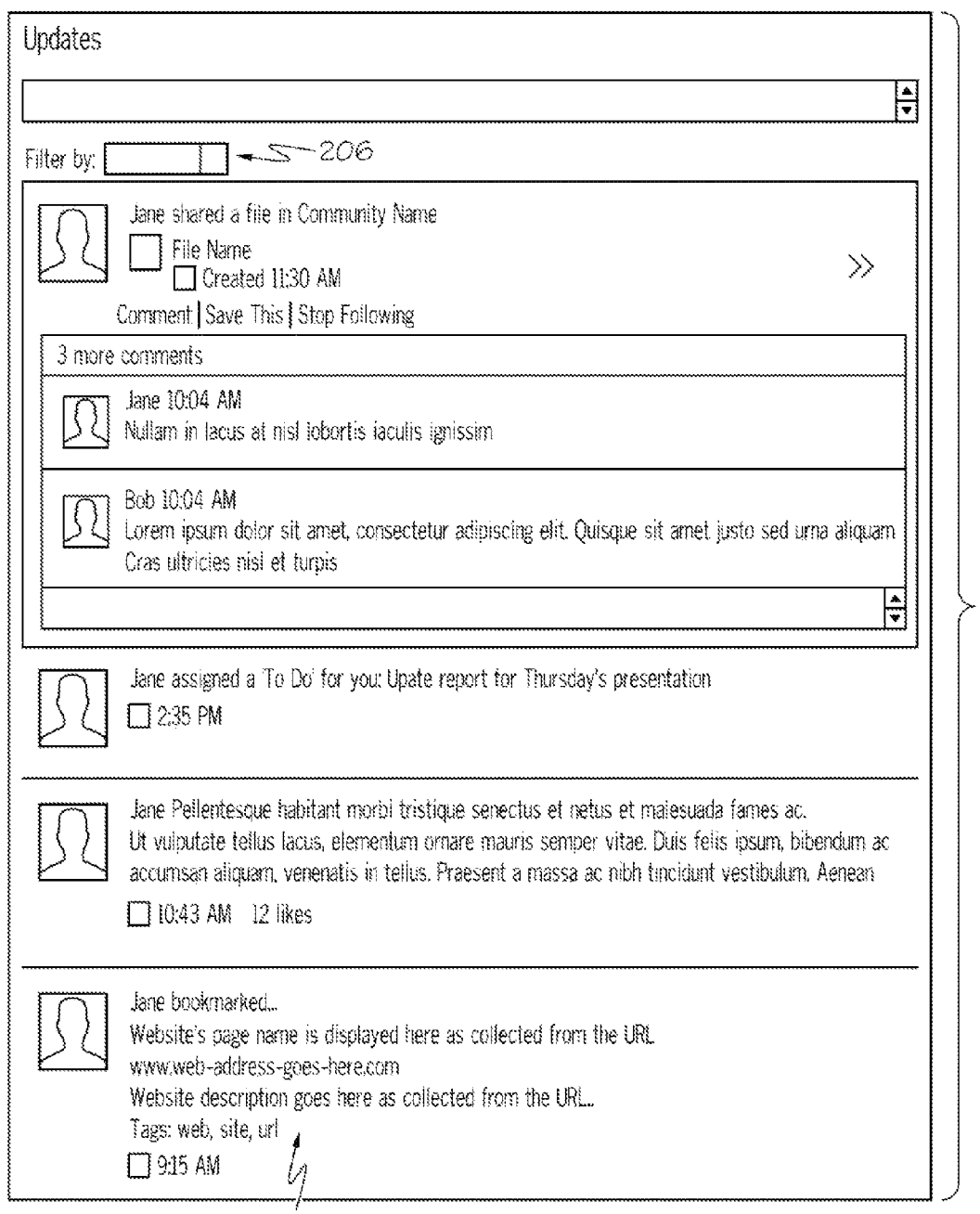
FIG. 2A is an example of an activity stream of a user in a social network prior to organizing messages based on temporal characteristics of the messages in accordance with an embodiment of the present invention.

In block 112, a request may be received from the user to present an activity stream associated with the user. The request may include the user accessing a social media network application or module. The activity stream of the user may be presented in a graphical user interface (GUI) on a computer system or client of the user. Referring also to FIG. 2A, FIG. 2A is an example of a GUI 200 including an activity stream 202 of a user in a social network prior to organizing the messages 204 based on temporal characteristics of the messages in accordance with an embodiment of the present invention.

In block 114, an organization feature may be selected by the user to run an organizing operation on the activity stream, such as activity stream 202 in FIG. 2A. An example of the organization feature that may be selected for running the organizing operation on the activity stream 202 may be a drop-down menu, such as the drop-down menu 206 labeled "Filter by:" in FIG. 2A. In another embodiment, the feature for selecting the organizing operation may be an icon, a button or any other feature that may be used in the computing arts for selecting performance of a particular function or operation.

Figure 2B:
FIG. 2B is an example of the activity steam in FIG. 2A after organizing the messages based on temporal characteristics of the messages in accordance with an embodiment of the present invention.

In block 116, the messages 204 in the activity stream 202 may be organized based on tense, decay, immediacy or other temporal characteristics or non-temporal characteristics in response to the user selecting the organization feature 206 in the GUI 200. Referring also to FIG. 2B, FIG. 2B is a GUI 208 illustrating an example of the activity steam 202 in FIG. 2A after organizing (filtering, sorting, etc.) based on temporal characteristics of the messages 204 in accordance with an embodiment of the present invention. As illustrated in FIG. 2B, the messages 204 may be listed in priority order based on temporal characteristics, such as tense, decay, immediacy or the like. Messages that have been invalidated or expired because of the decay or decay function may be filtered or removed from the list of messages 204 and the remaining messages may be listed in priority order based on the temporal characteristics including tense and immediacy. A single message including multiple tenses may be filtered and sorted by each tense.

In block 118, temporal characteristics may be applied to limit the number of messages that may be presented. For example, messages posted within a preset time period, such as the past 24 hours, a preset number of days or other preset time duration, may be filtered or removed and not presented as part of the organized messages in the activity stream. The temporal characteristics may also be applied based on a predetermined group of users, such as a particular organization or department within an organization or company.

In block 120, the activity stream including the organized (filtered, sorted, etc.) messages may be presented. As previously discussed, the GUI 208 in FIG. 2B is an example of the organized activity stream 202 of FIG. 2A in accordance with an embodiment of the present invention.

Figure 3:
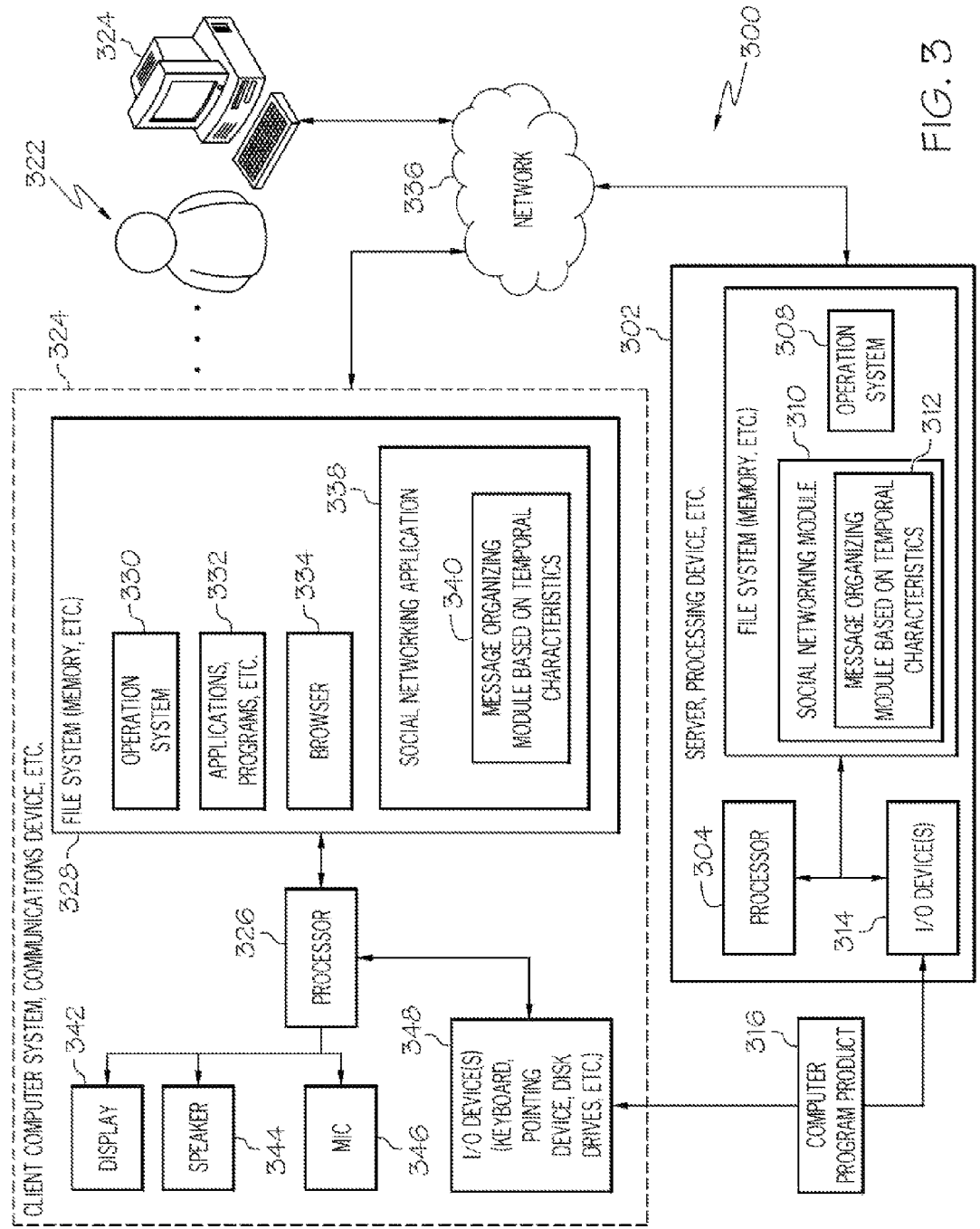
FIG. 3 is a block schematic diagram of an example of a system configured for organizing messages based on temporal characteristics of the messages in accordance with an embodiment of the present invention.

FIG. 3 is a block schematic diagram of an example of a system 300 configured for organizing messages (sorting, filtering, etc.) based on temporal characteristics of the messages in accordance with an embodiment of the present invention. The method 100 of FIGS. 1A-1B may be embodied in and performed by the system 300. The system 300 may include a processing device 302. The processing device 302 may be a server or similar processing device. The processing device 302 may include a processor 304 for controlling operation of the processing device 302 and for performing functions, such as those described herein with respect to filtering and sorting, messages of a social network. The processing device 302 may also include, a file system 306 or memory. An operating system 308, applications and other programs may be stored on the file system 306 for running or operating on the processor 304. A social networking module 310 or system may also be stored on the file system 306 and may be compiled and run on the processor 304 to perform the functions for organizing messages of a social network similar to that described herein. The method 100 of FIGS. 1A-1B may be embodied in the social networking module 310 and performed by the processor 304 when the social networking module 310 is compiled and run on the processor 304.

The social networking module 310 may include a message organizing module 312 for organizing message of the social network of a user based at least on temporal characteristics of the messages as described herein. In another embodiment, the message organizing module 312 may be separate from the social networking module 310 and operate in coordination with the social networking module 310 to perform the operations described, herein. Similar to that previously described, the message organizing module 312 may be configured to organize the messages of a social network by filtering and sorting the messages based at least on temporal characteristics that may include a tense, decay and immediacy associated with each of the messages similar to that described with reference to FIGS. 1A-1B.

The processing device 302 may also include one or more input devices, output devices or combination input/output devices, collectively I/O devices 314 in FIG. 3. The I/O devices 314 may include, but are not necessarily limited to, a keyboard or keypad, pointing device, such as a mouse, disk drive and any other devices to permit a user to interface with and control operation of the processing device 302 and to access the social networking module 310 or system. At least one of the I/O devices 314 may be a device to read a computer program product, such as computer program product 316. The computer program product 316 may be similar to that described in more detail, herein. The social networking module 310 may be loaded on the file system 306 from a computer program product, such as computer program product 316.

A member of a social network or user 322 of the system 300 for social networking may use a computer system 324 or communications device to access the processing device 302 or server and social networking module 310 or system. The computer system 324 or communications device may be any sort of communications device including a mobile or handheld computer or communications device. The computer system 324 may include a processor 326 to control operation of the computer system 324 and a file system 328, memory or similar data storage device. An operating system 330, applications 332 and other programs may be stored on the file system 328 for running or operating on the processor 326. A web or Internet browser 334 may also be stored on the file system 328 for accessing the processing device 302 or server via a network 336. The network 336 may be the Internet, an intranet or other private or proprietary network.

In accordance with an embodiment, a social networking application 338, feature or module may also be stored on the file system 328 and operate on the processor 326 of the user's computer system 324. The social networking application 338 may include a message organizing module 340 for organizing messages of a social network, in which the use 322 is a member similar to that described herein. In another embodiment, the message organizing module 340 may be a separate module from the social networking application 338 and operate in cooperation with the social networking application 338 to perform the functions described herein. The social networking application 338 operating on the computer system 326 may interface with or operate in conjunction with the social networking module 310 or system on the processing device 302 or server to perform the functions and operations described herein for organizing social media messages. Accordingly, social networking application 338 operating, on the computer system 324 may perform some of the functions and operations of the method 100 and social networking, module 310 operating on the server 302 may perform other functions of the method 100. Some embodiments attic present invention may include only the social networking module 310 on the processing device 302 or server, and other embodiments may include only the social networking application 338 on the client, computer system 324 or communications device.

The computer system 324 may also include a display 342, a speaker system 344, and a microphone 346 for voice communications. One or more user interfaces may be presented on the display 342 for controlling operating the social networking module 310 and social networking application. 338 and for performing the operations and functions described herein. For example, the graphical user interface 200 described with reference to FIGS. 2A and 2B.

The computer system 324 may also include one or more input devices, output devices or combination input/output, devices, collectively I/O devices 348. The I/O devices 348 may include a keyboard or keypad, pointing device, such as a mouse, disk drives and any other devices to permit a user, such as user 322, to interface with and control operation of the computer system 324 and to access the social networking application 338 and social networking module or system 310 on server 302. The I/O devices 348 may also include at least one device configured to read computer code from a computer program product, such as computer program product 316.

The flowchart and block diagrams in Figures illustrate the architecture, functionality, and operation of possible implementations of system methods, and computer program products according to various embodiments of the present invention. In this regard, each block in the flowchart or block diagrams may represent a module segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention.

The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for organizing messages, comprising:
    detecting, by a processor, receipt of each new message of an activity stream comprising a group of messages;
    determining, by the processor, a tense associated with each new message;
    associating, by the processor, the tense with each new message, at least the tense being used for organizing the group of messages of the activity stream;
    determining, for each new message, at least one of a time the message is posted to a social network and a time the message is first viewed by a member of the social network;
    associating, with each new message, a decay function based on at least one of the time the message is posted to the social network and the time the message is first viewed by the member of the social network, wherein associating the decay function to each new message comprises one of invalidating or changing the tense of each new message based on a duration of time from at least one of when each new message was posted to the social network and when each new message was first viewed by the member of the social network; and
    adding, by the processor, each new message and the associated tense of the message to the activity stream.

2. The method of claim 1, wherein determining the tense associated with each new message comprises using natural language processing to determine at least one of a past tense, a present tense, and a future tense associated with each new message.

3. The method of claim 2, wherein determining the tense associated with each new message comprises determining any nuances based on a language of each new message.

4. The method of claim 3, wherein determining any nuances based on the language of each new message comprises determining any derivations of the tense associated with each new message based on the language of each new message by translating each new message that is in a language other than English to English using a classifier-based tense model for statistical machine translation of each new message.

5. The method of claim 1, further comprising:
    determining an immediacy associated with each new message; and
    associating an indication of the immediacy with each new message.

6. The method of claim 5, wherein determining the immediacy associated with each new message comprises:
    detecting in each new message a description comprising at least one of a request for performance of a task and an event scheduled to occur at a future time;

detecting in each new message at least one of a due date for completion of the task and a date for occurrence of the event; and assigning to a particular new message a default due date for determining the immediacy in response the particular new message not including the due date for completion of the task.

7. The method of claim 1, further comprising organizing the group of messages in the activity stream based on at least one of the tense, immediacy and decay function associated with each message in the activity stream in response to a user selecting an organization feature.

8. The method of claim 7, presenting the activity stream including the organized messages based on at least one of the tense, immediacy and the decay associated with each message.

9. The method of claim 8, further comprising applying a temporal characteristic to each message in the activity stream to limit a number of messages being presented, wherein the temporal characteristic comprises a predetermined time period since the message was posted to the social network.

10. The method of claim 7, wherein a particular message comprises a plurality of tenses and wherein organizing the plurality of messages comprises sorting a the particular message by each of the tenses.

11. The method of claim 1, further comprising prompting a user to set a time period for a particular message to expire.

12. The method of claim 1, further comprising prompting a user to set a time period to change the tense of a particular message.

\* \* \* \* \*